US006186247B1

(12) United States Patent
Wang

(10) Patent No.: US 6,186,247 B1
(45) Date of Patent: Feb. 13, 2001

(54) DRIVE ASSEMBLY FOR AN ELECTRIC HAND TOOL

(76) Inventor: Ta-Chin Wang, No. 10, Hsin-Jen Rd., Tainan (TW)

(*) Notice: Under 35 U.S.C. 154(b), the term of this patent shall be extended for 0 days.

(21) Appl. No.: 09/584,707

(22) Filed: Jun. 1, 2000

(51) Int. Cl.[7] .......... B23Q 5/00
(52) U.S. Cl. .......... 173/93.5; 173/93; 173/176
(58) Field of Search .......... 173/93, 93.5, 93.6, 173/176, 216, 179; 81/54

(56) References Cited

U.S. PATENT DOCUMENTS

| | | | | |
|---|---|---|---|---|
| 5,379,851 | * | 1/1995 | Huang | 173/179 |
| 5,435,398 | * | 7/1995 | Juan | 173/176 |
| 5,740,892 | * | 4/1998 | Huang | 173/93 |
| 5,887,666 | * | 3/1999 | Chen et al. | 173/93.5 |
| 5,915,484 | * | 6/1999 | Hsieh | 173/176 |
| 5,941,319 | * | 8/1999 | Juan | 173/93.5 |
| 6,119,794 | * | 9/2000 | Chen | 173/93.5 |

* cited by examiner

*Primary Examiner*—Scott A. Smith
(74) *Attorney, Agent, or Firm*—Rosenberg, Klein & Lee

(57) ABSTRACT

A drive assembly for an electric hand tool uses a ratchet and two opposed, spring-loaded pawls. The ratchet is integrally formed as a dovetail flange on the tool shaft inside a hollow rotor. The pawls are asymmetrical and pivotally mounted inside a recess in the rotor such that the centrifugal force generated by the rotation of the rotor causes the appropriate pawl to engage the ratchet and rotate the tool in the appropriate direction. When the rotor stops rotating, the spring causes the pawl to disengage from the ratchet and return to a rest position. This drive assembly is advantageous in that it completely does away with the noise generated by the gears in the conventional drive assembly and is much cheaper and more convenient to repair.

9 Claims, 5 Drawing Sheets

DRIVE ASSEMBLY FOR AN ELECTRIC HAND TOOL

BACKGROUND OF THE INVENTION

1. Field of the Invention

The present invention relates to a drive assembly, and more particularly to a drive assembly for an electric hand tool.

2. Description of Related Art

A conventional drive assembly for an electric hand tool in accordance with the prior shown in FIGS. 6–7 comprises a reversible motor (600) and a pinion gear (60) mounted on the motor shaft (not numbered) of the reversible motor (600). A hollow rotor (70) has a driven gear (61) formed on the end facing the reversible motor (600). The rotor (70) is mounted inside the hand tool such that the driven gear (61) is engaged with the pinion gear (60). A groove (72) is formed in one side of the rotor (70) to house a retainer (80). A first hook (71) extends out from each side of the rotor (70) adjacent to the side with the groove (72). A second hook (81) corresponding to the first hook (71) on the rotor (70) is formed on each end of the retainer (80). A spring is connected to each corresponding pair of first hooks (71) and second hooks (81). One end of a spring (91) is hooked on a first hook (71), and the other is hooked on the corresponding second hook (81). A drive block (90) is mounted in the rotor (70) inside the retainer (80). A main shaft (92) is rotatably mounted in the rotor (70). A transmission block (921) is securely mounted on one end of the main shaft (92) in the rotor (70). The drive block (90) drives the transmission block (921) and the main shaft (92) when the rotor (70) is rotated by the reversible motor (600).

The drive assembly for an electric hand tool as described above has several disadvantages.

1. The conventional drive assembly for an electric hand tool is noisy when the gears of the electric hand tool are operated, especially when changing the direction of rotation.
2. The whole rotor must be replaced with a new one when any one of the gears is broken. It will take a lot of time and costs a lot of money.

The present invention has arisen to mitigate and/or obviate the disadvantages of the conventional drive assembly for an electric hand tool.

SUMMARY OF THE INVENTION

In accordance with one aspect of the present invention, a drive assembly for an electric hand tool is provided. The drive assembly for an electric hand tool includes a rotor connected to a reversible motor whereby the rotor is driven. The rotor includes an H-shaped recess defined to receive a pawl device. One end of a shaft is pivotally mounted in the recess and is selectively engaged with the pawl device by the centrifugal force generated when the rotor rotates. The rotor in accordance with the present invention is directly connected to the reversible motor to reduce noise during operating and all the parts are detachable to reduce the cost of repair and replacement.

Further benefits and advantages of the present invention will become apparent after a careful reading of the detailed description with appropriate reference to the accompanying drawings.

DETAILED DESCRIPTION OF THE INVENTION

Figure 1:
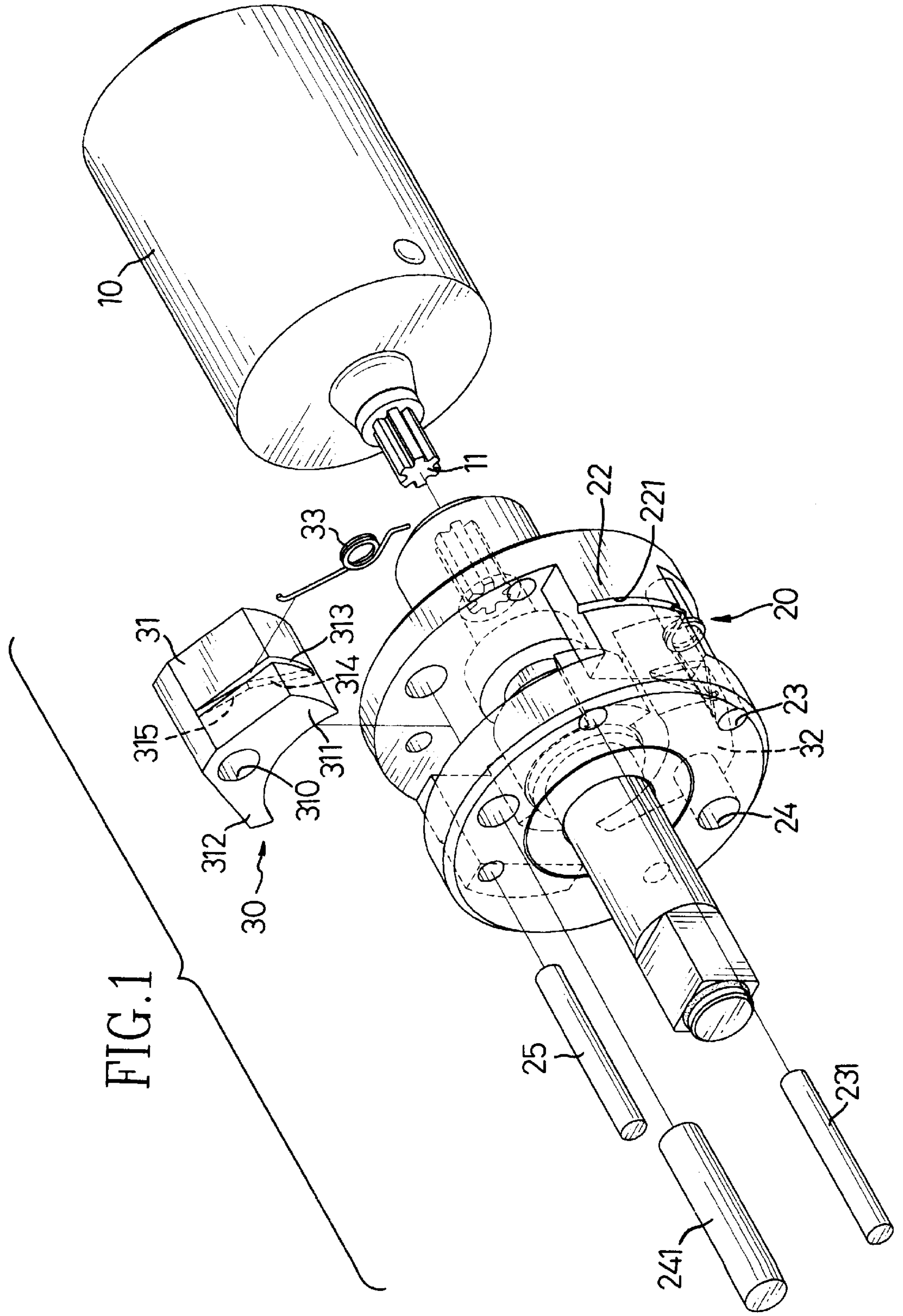
FIG. 1 is an exploded perspective view of a drive assembly for an electric hand tool in accordance with the present invention.
Figure 2:
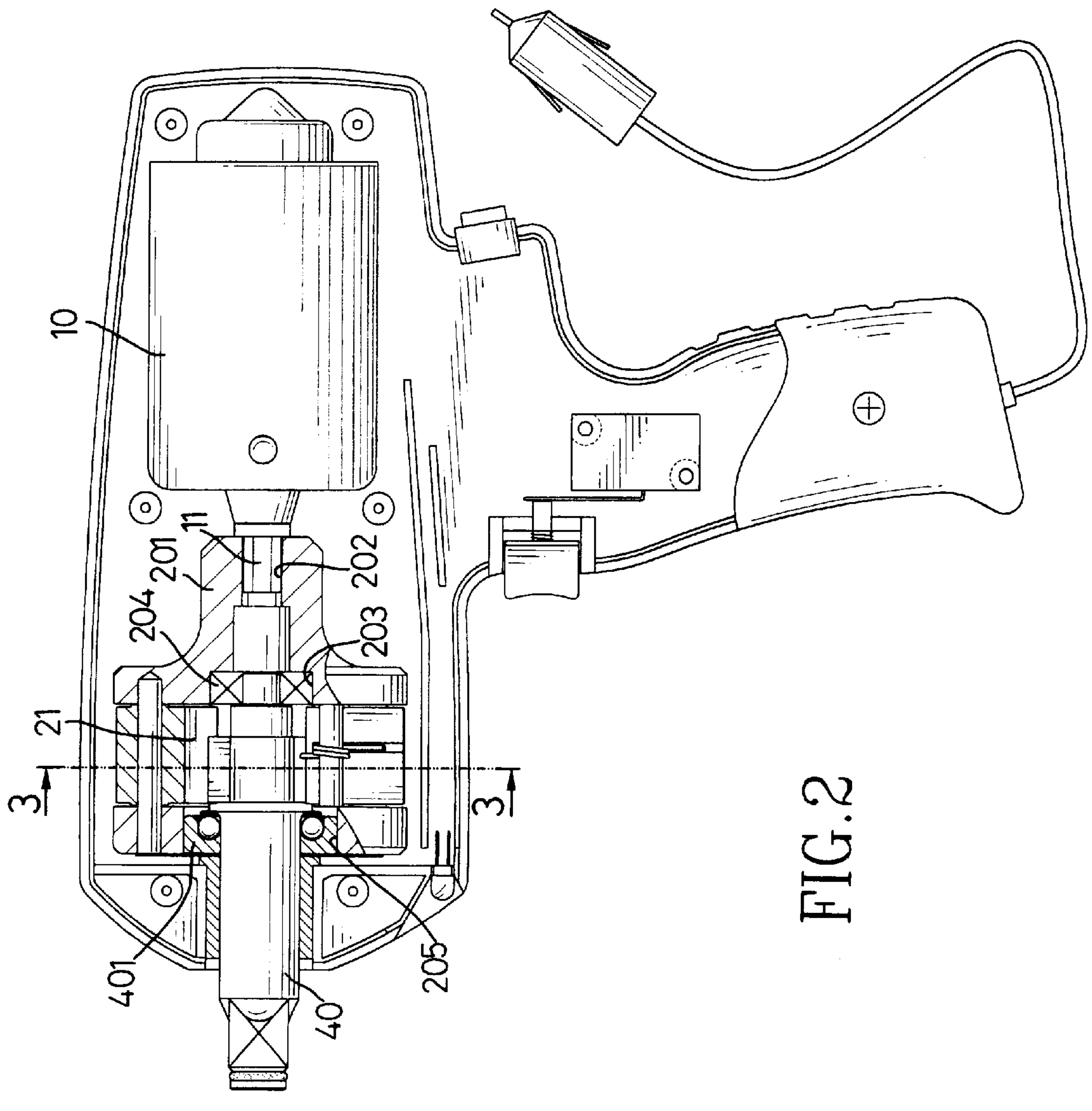
FIG. 2 is a cross-sectional side plan view of the drive assembly for an electric hand tool in FIG. 1.
Figure 3:
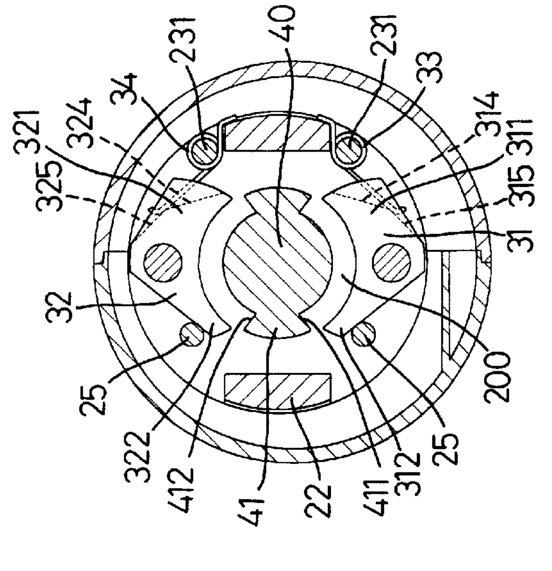
FIG. 3 is a cross sectional front plan view of the drive assembly for an electric hand tool along line 3—3 in FIG. 2.
Figure 6:
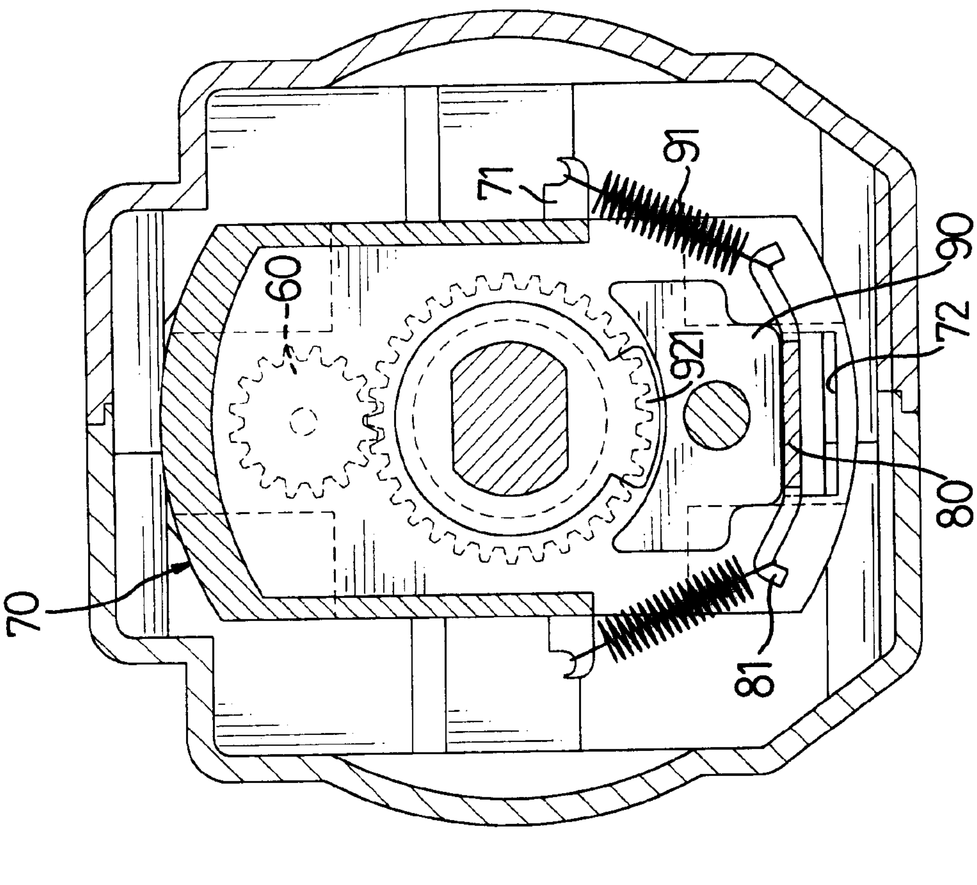
FIG.6 PRIOR ART
FIG. 6 is a cross-sectional front plan view of a conventional drive assembly for an electric hand tool in accordance with the prior art.
Figure 7:
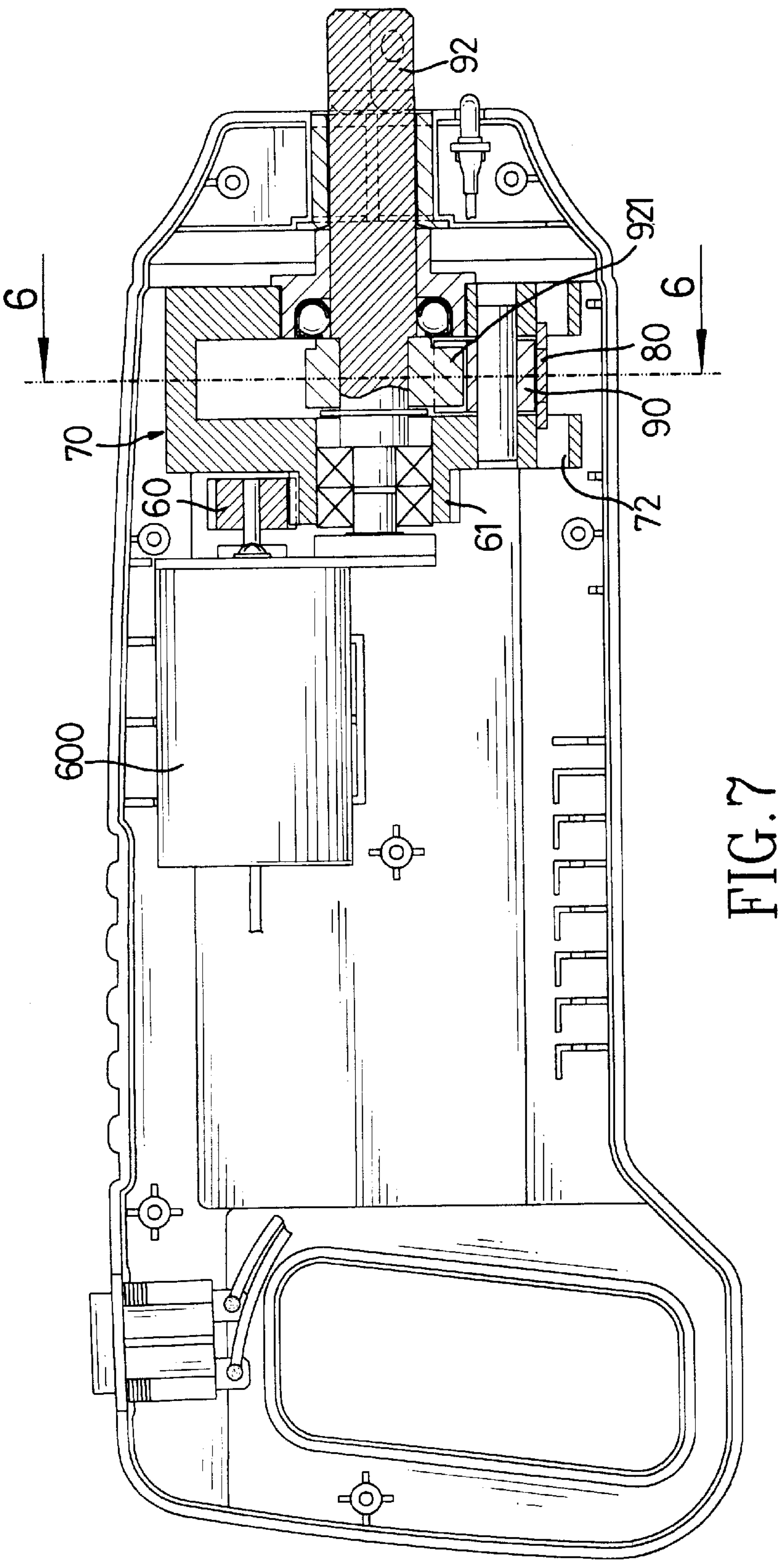
FIG.7 PRIOR ART
FIG. 7 is a cross sectional side plan view of the conventional drive assembly for an electric hand tool in FIG. 6.

With reference to the drawings and initially to FIGS. 1–3, a drive assembly for an electric hand tool in accordance with the present invention comprises a reversible motor (10), a hollow rotor (20), a tool shaft (40) and a pawl device (30). A keyed shaft (11) extends through the reversible motor (10). The hollow rotor (20) is securely connected to the keyed shaft (11). One end of the tool shaft (40) is rotatably mounted in the center of the rotor (20). The pawl device (30) is mounted in the rotor (20) to drive the tool shaft (40) in the selected direction.

The rear end of the rotor (20) has a protrusion (201) extending toward the reversible motor (10) with a keyed hole (202) defined to correspond to and securely receive the keyed shaft (11). A second recess (203) aligned with the keyed hole (202) is defined on the forward end of the rotor (20) protrusion (20 1) to securely received a first bearing (204). A through hole (205) is defined in the forward end of the rotor (20). The keyed hole (202), the second recess (203) and the through hole (205) are defined along the central axis of the rotor (20).

The rotor (20) includes an H-shaped recess (21) defined between the two ends of the rotor (20) and forms two bridges (22) on opposite sides of the rotor (20). A first groove (221) is defined on the outside surface of at least one of these bridges (22). The rotor (20) has two first through holes (23) are defined in the front and rear parts of the rotor (20) near one of the bridges (22) that contains the first groove (221). The ends of a first pin (231) are inserted into the first through holes (23). A pair of second through holes (24) are formed near the ends of a diameter of the rotor (20) orthogonal to the central diameter of the two bridges (22). The ends of a second pin (241) are inserted into the second through holes (24). Two stops (25) extend into the recess (21) on the opposite side of the diameter through the second through holes (24) from the first through hole (23). The axes of the two stops (25) are parallel to those of the second through hole (24) and of the first through hole (23).

The pawl device (30) includes a first pawl (31) and a second pawl (32) each pivotally mounted in the recess (21) by the two second pins (241). The first pawl (31) and the second pawl (32) are substantially L-shaped and have two free ends with the pivot point at the junction of the two legs of the “L”. The first pawl (31) is pivotally mounted and received in the recess (21) of the rotor (20). The first pawl (31) has a hole (310) defined at the junction of the two legs of the “L” and is held in place after the second pin (241) penetrates the hole (311) in the pawl (31). The leg (311) of the first pawl (31) on the side toward the first pin (231) is considerably more massive than the other leg (312) that abuts the stop (25) when the rotor (20) is motionless. A second groove (313) is defined on the outside of the first pawl (31) parallel to the rear end of the rotor (20) and aligns with the first groove (221) in the rotor (20). The bottom of the second groove (313) has an interior surface (314) and an exterior surface (315). The interior surface (314) and the exterior surface (315) form an obtuse angle. The second pawl (32) is the same as the first pawl (31) and includes a massive leg (321) on the side of the first pin (231), a light leg (322) abutting the stop (25) when the rotor (20) is motionless. A second groove (323) is formed in the second pawl (32) with an interior surface (324) and an exterior surface (325) at the bottom of the groove (323). The interior face of the first pawl (31) and the second pawl (32) are concave and form a round passage (200). A first torsion spring (33) and a second torsion spring (34) are respectively mounted around the two first pins (231). One end of the first torsion spring (33) and the second torsion spring (34) are seated in the first groove (221), and the other ends are seated in the corresponding second groove (313). The end of the torsion spring (33,34) in the second groove (313,323) abuts the exterior surface (315; 325) of the first and second pawl (31; 32) when the shaft (40) is motionless.

The interior end of the tool shaft (40) is securely received in the first bearing (204), and the exterior end extends out through the front of the electric hand tool. A second bearing (401) is securely received in the through hole (205) of the rotor (20) to prevent the tool shaft (40) from detaching from the rotor (20). The shaft (40) has at least one dovetail flange (41) extends from the side of the tool shaft (40) inside the rotor (20). The flange (41) is sector. One face (411) of the dovetail flange (41) corresponds to the light leg (312) of the first pawl (31), and the other face (412) correspond to the light leg (322) of the second pawl (32).

Figure 4:
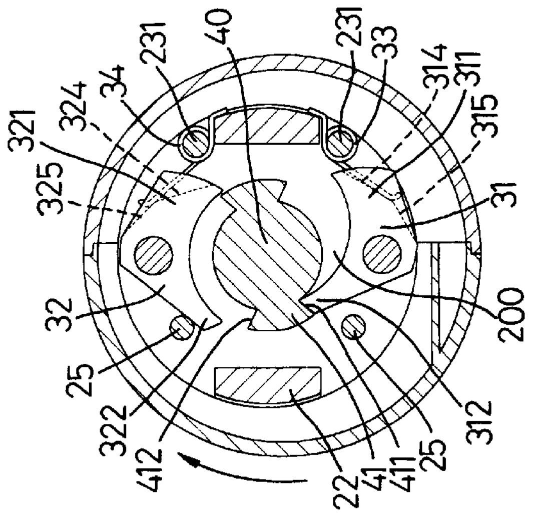
FIG. 4 is an operational cross sectional front plan view of the drive assembly for an electric hand tool along line 3—3 in FIG. 2 when the drive assembly rotates clockwise.

With reference to FIG. 4, a centrifugal force is generated when the rotor (20) rotates. When the rotor (20) rotates in a clockwise direction, the centrifugal force pushes the massive leg (311) of the first pawl (31) against the first torsion spring (33). Then the end of the first torsion spring (33) in the second groove (313) slides from the exterior surface (315) to the interior surface (314) of the second groove (313) in the first pawl (31). Thus the light leg (312) of the first pawl (31) engages with the corresponding face (411) of the dovetail flange (41) to drive the tool shaft (40) in a clockwise direction. The first torsion spring (33) pushes the first pawl (31) back to make the light portion (312) of the first pawl (31) abut the stop (25) when the rotor stops (25).

Figure 5:
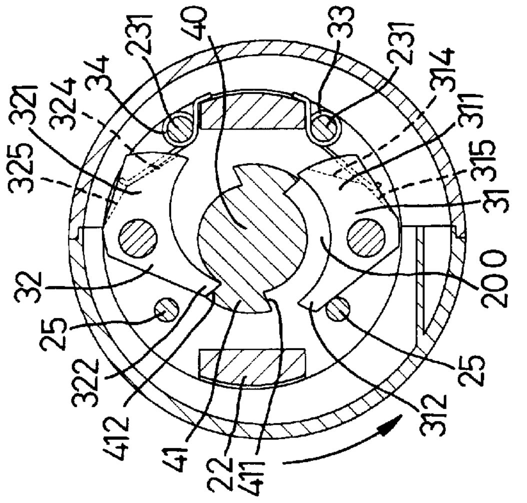
FIG. 5 is an operational cross sectional front plan view of the drive assembly for an electric hand tool along line 3—3 in FIG. 2 when the drive assembly rotates counterclockwise.

With reference to FIG. 5, when the rotor (20) rotates in a counterclockwise direction, the centrifugal force pushes the massive leg (321) of the second pawl (32) against the second torsion spring (34). Then the end of the first torsion spring (34) in the second groove (323) in the second pawl (32) slides from the exterior surface (325) to the interior surface (324) in the second groove (323). Thus the light leg (322) of the second pawl (32) engages with the corresponding face (412) of the dovetail flange (41) to drive the shaft (40) in a counterclockwise direction. The first torsion spring (33) pushes the first pawl (31) back to make the light leg (312) of the first pawl (31) abut the stop (25) when the rotor stops (25). The first torsion spring (33) pushes the first pawl (31) back to make the light leg (3 12) of the first pawl (31) abut the stop (25) when the rotor stops (25).

There are no gears in the drive assembly for an electric hand tool in accordance with the present invention so the electric hand tool is silent during operation. All of the parts of the drive assembly can easily be disassembled. It is a convenient design for assembly and repair.

Although the invention has been explained in relation to its preferred embodiment, it is to be understood that many other possible modifications and variations can be made without departing from the spirit and scope of the invention as hereinafter claimed.

What is claimed is:

1. A drive assembly for an electric hand tool comprising:

a rotor (20) including a first end and a second end, a recess (21) defined between said two ends of said rotor (20) with at least one bridge (22) spanning said recess (21), said first end of said rotor (20) having a protrusion (201) extending therefrom, said protrusion (201) containing a keyed hole (202) in a center to receive a keyed shaft (11) of a reversible motor (10) and a second recess (203) on a forward end of said protrusion (201) aligned with said keyed hole (202), a through hole (205) define in said second end of said rotor (20) aligned with said second recess (203), said rotor (20) having a diameter parallel to said bridges (22), two second through hole (24) respectively defined near a end of said diameter of said rotor (20) orthogonal to a central diameter passing through said bridges (22);

two second pins (241) each received in a corresponding pair of said second through holes (24) and having two ends respectively received in said first and second ends of said rotor (20);

two stops (25) extending into said recess (21) and each having an axis parallel to the axis of said two second through holes (24);

a tool shaft (40) rotatably mounted in said rotor (20), said tool shaft (40) having a first end extending through said through hole (205) and pivotally received in said second recess (203) on the front face of said rotor (20) protrusion (201), and a second endextending out through a front of said electric hand tool;

at least one dovetail flange (41) extending radially out from a periphery of said tool shaft (40) in said recess (21) of said rotor (20), a total diameter at said dovetail flange (41) and said tool shaft (40) being smaller than a diameter of said through hole (205) of said rotor (20);

a second bearing (205) mounted around said tool shaft (40) and securely received in said through hole (205) to prevent said tool shaft (40) from detaching from said rotor (20);

a pawl device (30) having a first pawl (31) and a second pawl (32) each pivotally mounted in said recess (21) of said rotor (20) around said tool shaft (40) by said second pin (241) and aligning with each other to form a round passage (200) to selectively engaged with said dovetail flange (41) of said tool shaft (40), said round passage (200) having a diameter being slightly greater than said total diameter of said dovetail flange (41) and said tool shaft (40);

a first spring (33) having a first end mounted on said bridge (22) and a second end mounted on said first pawl (31); and a second spring (34) having a first end mounted on said bridge (22) and a second end mounted on said second pawl (32).

2. The drive assembly for an electric hand tool as claimed in claim 1, wherein said rotor (20) includes a first bearing (204) securely received in said second recess (203) of said protrusion (201) in said rotor (20), said first bearing (204)

having a hole defined to securely receive said first end of said tool shaft (40).

3. The drive assembly for an electric hand tool as claimed in claim 1, wherein said first pawl (31) and second pawl (32) are substantially L-shaped and each has a massive leg (311, 321) and a light leg (312, 322), said massive leg (311, 321) oriented toward said bridge (22), said light leg (312, 322) abutting said stop (25) and selectively engaged with said dovetail flange (41) of said tool shaft (40).

4. The drive assembly for an electric hand tool as claimed in claim 3, wherein said massive leg (311, 321) of said pawls (31, 32) includes a second groove (313, 323) defined on a outside surface and parallel to said first end of said rotor (20), said second groove (313, 323) having a bottom.

5. The drive assembly for an electric hand tool as claimed in claim 4, wherein said bridge (22) includes a first groove (221) defined on a outside surface and aligning with said second groove (313, 323) of said pawls (31, 32).

6. The drive assembly for an electric hand tool as claimed in claim 5, wherein said rotor (20) has two first through holes (23) defined parallel with an axis of said rotor (20), said two first through holes (23) each receiving one end of a first pin (231) therein.

7. The drive assembly for an electric hand tool as claim in claim 6, wherein said first spring (33) and second spring (34) are torsion springs each formed with a central hole to allow said first pin (231) to extend through said central hole whereby said first spring (33) and second spring (34) are respectively pivotally mounted in said recess (21) of said rotor (20).

8. The drive assembly for an electric hand tool as claimed in claim 7, wherein the end of said first spring (33) and said second spring (34) in contact with said bridge (22) abuts a bottom of said first groove (221), and said second end of said first spring (33) and said second spring (34) in contact with said pawls (31, 32) slidably abutting said bottom of said second groove (313 323).

9. The drive assembly for an electric hand tool as claimed in claim 7, wherein said bottom of said second grooves (313, 323) includes an interior surface (314, 324) and an exterior surface (315, 325) to form an obtuse angle, said second end of said first spring (33) and second spring (34) in contact with said pawls (31, 32) selectively abutting said interior surface (314, 324) and said exterior surface (315, 325) of said bottom of said second groove (313, 323).

* * * * *